July 19, 1932. J. L. DRAKE ET AL Re. 18,533

SHEET GLASS GRINDING AND POLISHING APPARATUS

Original Filed Sept. 29, 1926 3 Sheets-Sheet 1

Inventor
JOHN L. DRAKE
FRANK FRASER

By Frank Fraser
Attorney

July 19, 1932. J. L. DRAKE ET AL Re. 18,533

SHEET GLASS GRINDING AND POLISHING APPARATUS

Original Filed Sept. 29, 1926 3 Sheets-Sheet 2

Inventor
JOHN L. DRAKE
FRANK FRASER

By Frank Fraser
Attorney

July 19, 1932. J. L. DRAKE ET AL Re. 18,533

SHEET GLASS GRINDING AND POLISHING APPARATUS

Original Filed Sept. 29, 1926 3 Sheets-Sheet 3

Inventor
JOHN L. DRAKE.
FRANK FRASER.

By Frank Fraser
Attorney

Reissued July 19, 1932 Re. 18,533

UNITED STATES PATENT OFFICE

JOHN L. DRAKE AND FRANK FRASER, OF TOLEDO, OHIO, ASSIGNORS TO LIBBEY-OWENS-FORD GLASS COMPANY, OF TOLEDO, OHIO, A CORPORATION OF OHIO

SHEET GLASS GRINDING AND POLISHING APPARATUS

Original No. 1,836,364, dated December 15, 1931, Serial No. 138,515, filed September 29, 1926. Application for reissue filed February 29, 1932. Serial No. 595,955.

The present invention relates to sheet glass grinding and polishing apparatus.

An object of the invention is to provide a sheet glass surfacing apparatus comprising a plurality of abrasion rolls, some of said rolls being adapted to grind a sheet of glass, and other of said rolls being adapted to polish a sheet of glass after it has been ground.

Another object of the invention is to provide a sheet glass grinding and polishing apparatus wherein a sheet of glass is continuously and progressively moved in contact with a series of rotatable cylindrical abrasion rolls, the texture of the abrasion rolls being progressively finer from one end toward the other, the last set of rolls being adapted to polish the sheet of glass.

Still another object of the invention is to provide an apparatus of this nature wherein a sheet of glass is adapted to be ground by means of an abrasive in cake form, the same sheet then being adapted to be polished by means of a polishing medium in solid form.

Other objects and advantages of the invention will become more apparent during the course of the following description.

In the drawings wherein like numerals are employed to designate like parts throughout the same, Fig. 1 is a diagrammatic view illustrating my improved grinding and polishing apparatus, Fig. 2 is a similar view illustrating a continuation of Fig. 1, Fig. 3 is a transverse section showing suitable driving means for said abrasion members, Fig. 4 is a top plan view of the arrangement shown in Fig. 3.

Heretofore, it has been customary to produce plate glass by subjecting a glass blank to the action of grinding and polishing units. The grinding units ordinarily include a metallic surfacing member which is moved in contact with the sheet to grind the same when coupled in its action with the action of an abrasive suspended in water. The polishing of the ground blank has been accomplished in the past by moving a plurality of felt blocks over the ground surface, the felt blocks being aided in their polishing action by means of rouge or the like.

In the present invention a sheet of glass is first ground by means of an abrasive in cake form, after which the ground sheet is polished by means of a polishing medium in cake form.

Figure 1:
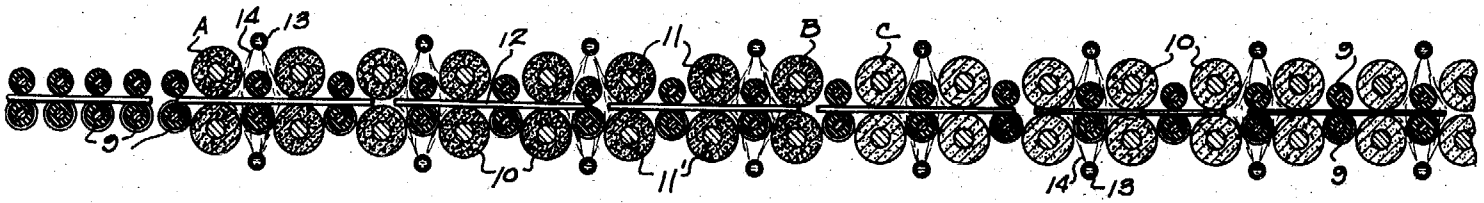
Figure 2:
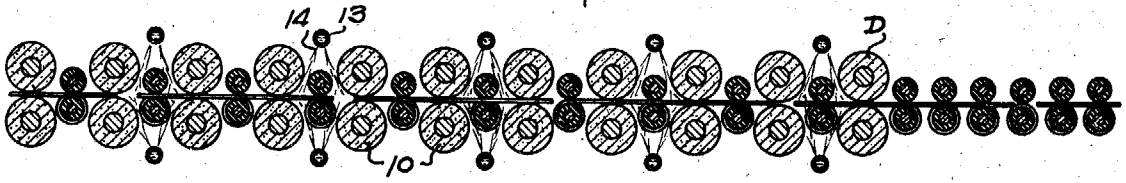

In the drawings the numeral 10 designates a plurality of abrasion rolls which are shown in Fig. 1 as being arranged in pairs. The abrasion rolls A to B are grinding rolls, while the rolls C to D inclusive are polishing rolls. Feed members or rolls 9 may be used to cause a continuous and progressive movement of the glass blanks 12 between the rolls as illustrated. Conduits 13 may be used to discharge a spray of water or the like 14 upon the rolls and sheet to prevent overheating of either. The texture of the rolls from A to B inclusive becomes progressively finer so that the sheet, after contacting with the roll B, will have a final "smooth" thereon, which means that the surfaces of the sheet are in a condition to be polished. The texture of the rolls C to D also may vary, if desired. These rolls are formed from a material such as pumice or rouge in cake form, the rouge and pumice being held in suitabe formation by means of a binder. The speed of the sheet and number of rolls is such that the sheet, upon leaving the last roll of the set of rolls D, will be polished and ready for commercial use.

Figure 3:
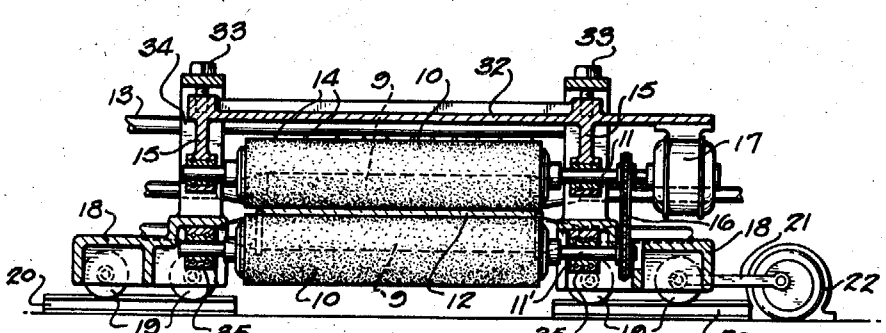
Figure 4:
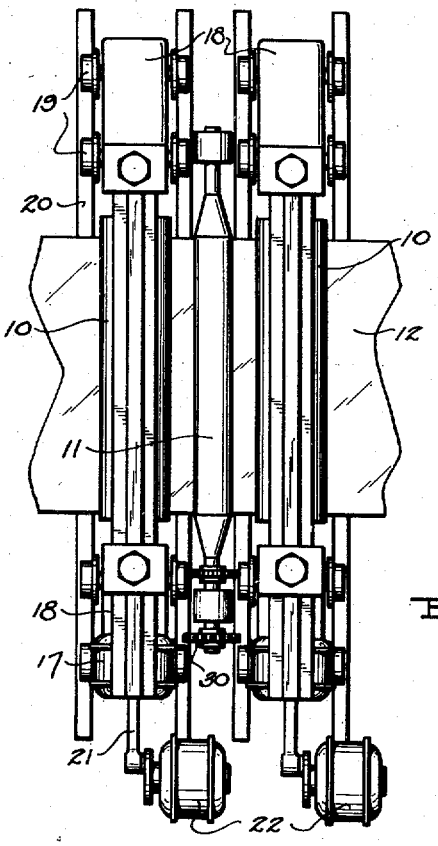

In Fig. 3 illustrated a method of supporting and driving the abrasion rolls 10. The upper and lower rolls of each pair are carried upon shafts 11 and 11′ respectively, the upper shaft 11 being supported in the journaled brackets 15 at each end depending from the supporting frame 32, said shafts 11 and 11′ being geared together by means of a sprocket chain or the like 16. A motor 17 is used to drive the shafts 11—11′ and rolls 10. The supporting frame 32 is adjustably supported by the machine screws 33 carried by the main frame 34 mounted upon the trucks 18 which are supported upon the wheels 19 resting on the rails 20. By proper adjustment of the machine screws 33, the upper roll 10 may be raised or lowered relative to the corresponding lower roll. The shaft 11′ of the lower roll is journaled at its opposite ends within brackets 35 carried by the trucks 18. By means of a pitman 21, connecting to one of the wheel shafts and being operated by a source of power 22, the trucks 18 carrying the rolls 10 may be reciprocated transversely of the path of travel of the sheet 12. It will thus be seen that each of the rolls is rotated about its own axis and reciprocated transversely of the path of the travel of the sheet of glass being surfaced.

Figure 5:
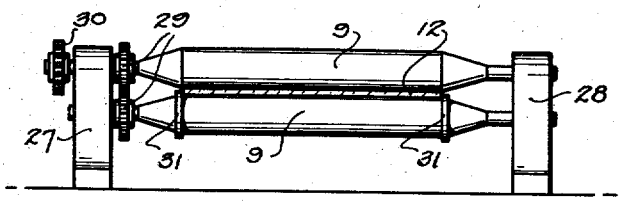
Fig. 5 is a transverse section through a portion of the apparatus showing the mounting for the feed rolls.

The feed rolls 9 are positioned between adjacent pairs of abrasion rolls and are adapted to feed the sheet therebetween and in contact therewith. As shown in Fig. 5, the feed rolls 9 may be journaled at their opposite ends in standards or the like 27 and 28 and are preferably geared together by means of gears 29 driven in any suitable manner such as by means of a sprocket and chain connection 30. Either one or both of the feed rolls of each pair is adapted to be provided at its opposite ends with flanges or collars 31 which serve to keep the plate of glass from moving sideways upon reciprocation of the abrasion rolls.

Figure 6:
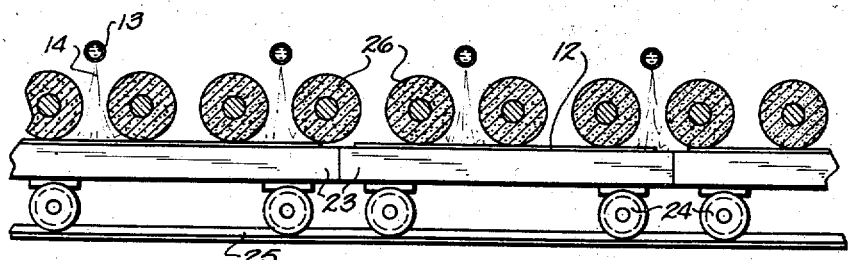
Fig. 6 is a longitudinal section illustrating another form of the invention.
Figure 7:
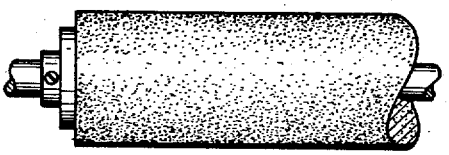
Figs. 7, 8 and 9 show different forms of abrasion rolls.
Figure 8:
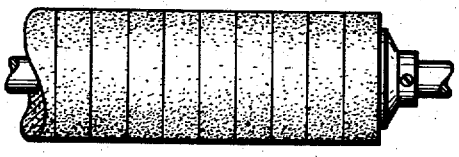
Figure 9:
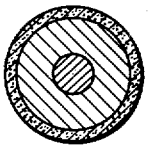
Figure 10:
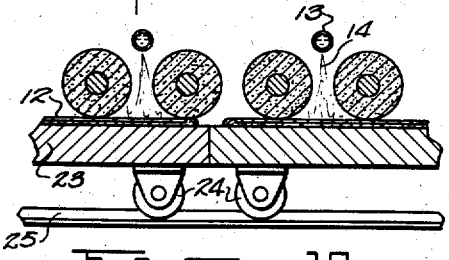
Fig. 10 is a fragmentary sectional view illustrating one means of supporting a glass blank during the grinding and polishing operations.

In Fig. 6 is shown a construction wherein one side only of a sheet of glass is surfaced at a time. The sheets of glass in this instance may be supported on tables 23 carried by the wheels 24 riding on the tracks 25. The tables may be coupled together to form a continuous unit, after which they are moved continuously and progressively beneath the abrasion rolls 26 which are mounted in a manner similar to the sets of rolls illustrated in Fig. 3.

The abrasion rolls or sets of rolls from A to B inclusive may be formed from emery, carborundum, or some similar material. The polishing rolls may likewise be formed from any material having the proper texture.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In apparatus for surfacing sheet glass, a plurality of pairs of abrasive rolls arranged in two lines for receiving the glass sheets to be surfaced therebetween, feed rolls positioned between adjacent pairs of abrasive rolls, means for driving the feed rolls to feed the glass between the abrasive rolls, means for driving the abrasive rolls, means for reciprocating said abrasive rolls transversely of the line of feed of the glass, and means carried at the ends of the feed rolls and engaging the edges of the glass for preventing transverse movement of the glass upon reciprocation of the abrasive rolls.

2. In apparatus for surfacing sheet glass, a plurality of pairs of abrasive rolls arranged in two lines for receiving the glass sheets to be surfaced therebetween, trucks arranged at opposite ends of the rolls, rails upon which said trucks are movably mounted, frames connecting opposed trucks and adapted to support the abrasive rolls, means carried by the frames for driving said rolls, and means connected with said trucks for moving the same to reciprocate the rolls transversely over the glass, feed rolls positioned between adjacent pairs of abrasive rolls, means for driving the feed rolls to feed the glass between the abrasive rolls, and means carried at the ends of the feed rolls for preventing transverse movement of the glass upon reciprocation of the abrasive rolls.

3. In apparatus for surfacing sheet glass, a plurality of pairs of abrasive rolls arranged in two substantially horizontal lines, means for feeding the glass sheet between the two lines of rolls and in contact therewith, means for supporting each pair of rolls, said means including trucks arranged at opposite ends thereof, rails upon which said trucks are mounted, means for moving said trucks upon said rails to reciprocate the abrasive rolls transversely of the line of movement of said sheet, and means for preventing transverse movement of said sheet upon reciprocating movement of said abrasive rolls.

4. In apparatus for surfacing sheet glass or other flat sheets or plates, means for passing the sheets to be treated in a definite predetermined path, a surfacing unit including spaced surfacing elements engaging opposite faces of said sheets to simultaneously surface the same during the travel thereof, and means for moving said surfacing elements as a unit transversely of the path of travel of the sheets.

5. In apparatus for surfacing sheet glass or other flat sheets or plates, means for passing the sheets to be treated in a definite predetermined path, a surfacing unit including spaced surfacing elements engaging opposite faces of said sheets to simultaneously surface the same during the travel thereof, means for moving said surfacing elements as a unit transversely of the path of travel of the sheets, and means for varying the distance between the surfacing elements.

6. In apparatus for surfacing sheet glass or other flat sheets or plates, means for passing the sheets to be treated in a definite predetermined path, a surfacing unit including spaced surfacing elements engaging opposite faces of said sheets to simultaneously surface the same during the travel thereof, a common supporting means for the surfacing elements, and means for moving said supporting means and the surfacing elements carried thereby transversely of the path of travel of the sheets.

7. In apparatus for surfacing sheet glass or other flat sheets or plates, means for passing the sheets to be treated in a definite predetermined path, a surfacing unit including spaced surfacing elements engaging opposite faces of said sheets to simultaneously surface the same during the travel thereof, a common supporting means for the surfacing elements, means for moving said supporting means and the surfacing elements carried thereby transversely of the path of travel of the sheets, and means carried by said supporting means for varying the distance between the surfacing elements.

8. In apparatus for surfacing sheet glass or other flat sheets or plates, means for passing the sheets to be treated in a definite predetermined path, a surfacing unit including spaced superimposed surfacing elements engaging opposite faces of said sheets to simultaneously surface the same during the travel thereof, a main supporting means for supporting the lower surfacing element, means carried by the main supporting means for supporting the upper surfacing element, and means for moving the said main supporting means and the surfacing elements carried thereby transversely of the path of travel of the sheets.

9. In apparatus for surfacing sheet glass or other flat sheets or plates, means for passing the sheets to be treated in a definite predetermined path, a surfacing unit including spaced superimposed surfacing elements engaging opposite faces of said sheets to simultaneously surface the same during the travel thereof, a main supporting means for supporting the lower surfacing element, means carried by the main supporting means for supporting the upper surfacing element, means for moving the said main supporting means and the surfacing elements carried thereby transversely of the path of travel of the sheets, and means carried by the main supporting means and engaging the means for supporting the upper surfacing element for varying the distance between the surfacing elements.

Signed at Toledo, in the county of Lucas, and State of Ohio, this 24th day of February, 1932.

JOHN L. DRAKE.
FRANK FRASER.